US011073592B2

(12) United States Patent
Crandall

(10) Patent No.: US 11,073,592 B2
(45) Date of Patent: *Jul. 27, 2021

(54) ENHANCED LORAN SYSTEM GENERATING CORRECTION FACTORS BASED UPON SATELLITE-DERIVED DATA AND RELATED METHODS

(71) Applicant: Eagle Technology, LLC, Melbourne, FL (US)

(72) Inventor: Daniel W. Crandall, Merritt Island, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 85 days.

This patent is subject to a terminal disclaimer.

(21) Appl. No.: 16/514,926

(22) Filed: Jul. 17, 2019

(65) Prior Publication Data

US 2021/0018586 A1 Jan. 21, 2021

(51) Int. Cl.
*G01S 1/24* (2006.01)
*G01S 1/04* (2006.01)
(Continued)

(52) U.S. Cl.
CPC .............. *G01S 1/245* (2013.01); *G01S 1/022* (2013.01); *G01S 1/0428* (2019.08); *G01S 1/08* (2013.01)

(58) Field of Classification Search
CPC . G01S 1/245; G01S 1/022; G01S 1/24; G01S 1/08
See application file for complete search history.

(56) References Cited

U.S. PATENT DOCUMENTS 3,763,419 A 10/1973 Barringer
6,710,599 B2 3/2004 Bosnar
(Continued)

FOREIGN PATENT DOCUMENTS

CN 103592659 A 2/2014
EP 3699625 8/2020
(Continued)

OTHER PUBLICATIONS

Rhe, Joon Hyo & Seo, Jiwon, "eLoran Signal Strength and Atmospheric Noise Simulation Over Korea", Journal of Positioning, Navigation, and Timing, vol. 2, Iss. 2, pp. 101-108, 2013 (Year: 2013).*

(Continued)

*Primary Examiner* — Erin F Heard
*Assistant Examiner* — Thomas M Hammond, III
(74) *Attorney, Agent, or Firm* — Allen, Dyer, Doppelt + Gilchrist, P.A.

(57) ABSTRACT

An enhanced Long Range Navigation (eLORAN) system may include an eLORAN controller configured to obtain satellite-derived conductivity data and satellite-derived temperature data for different geographical positions and generate eLORAN correction factors based thereon. The eLORAN system may also include eLORAN transmitter stations. The eLORAN system may also include an eLORAN receiver device that may include an eLORAN receive antenna and an eLORAN receiver coupled to the eLORAN receive antenna and configured to receive the eLORAN correction factors. The eLORAN receiver device may also include a controller coupled to the eLORAN receiver. The controller may be configured to cooperate with the eLORAN transmitter stations to determine an eLORAN receiver position corrected based upon the eLORAN correction factors.

17 Claims, 3 Drawing Sheets

(51) Int. Cl.
  *G01S 1/02* (2010.01)
  *G01S 1/08* (2006.01)

(56) References Cited

U.S. PATENT DOCUMENTS

| | | | |
|---|---|---|---|
| 6,940,446 | B2 | 9/2005 | Cist |
| 7,796,983 | B2 | 9/2010 | Pao et al. |
| 7,804,309 | B2 | 9/2010 | Cummins |
| 9,215,600 | B2 | 12/2015 | Motoyoshi |
| 9,948,452 | B1* | 4/2018 | Pearson ................. G01S 19/42 |
| 2008/0143350 | A1* | 6/2008 | Cummins ............... G01V 3/12 |
| | | | 324/694 |
| 2009/0146864 | A1* | 6/2009 | Zank ........................ G01S 1/24 |
| | | | 342/22 |
| 2010/0220008 | A1* | 9/2010 | Conover ................ G01S 1/245 |
| | | | 342/357.29 |
| 2017/0160370 | A1* | 6/2017 | Yakubisin ............... G01S 1/245 |
| 2017/0192102 | A1* | 7/2017 | Wietfeldt ................. G01S 5/10 |
| 2018/0355629 | A1* | 12/2018 | Dickey ..................... E04H 3/28 |
| 2020/0271746 | A1 | 8/2020 | Mason et al. |

FOREIGN PATENT DOCUMENTS

| | | |
|---|---|---|
| KR | 20160000725 A | 1/2016 |
| WO | 2017119969 | 7/2017 |

OTHER PUBLICATIONS

Rhee et al., "eLoran Signal Strength and Atmospheric Noise Simulation Over Korea", Journal of Positioning, Navigation, and Timing, vol. 2, Issue 2, pp. 101-108, 2013 (Year: 2013).*

Chris Hargreaves, "ASF Measurement and Processing Techniques to allow Harbour Navigation at High Accuracy with eLoran", Sep. 2010, Dissertation submitted to the University of Nottingham (Year: 2010).*

Hwang et al., "An Analysis of ASF Variations and Temperature", copyright 2014, IEEE (Year: 2014).*

Luo et al.; "ASF Effect Analysis Using an Integrated GPS/eLORAN Positioning System;" Article; Presented at ION NTM 2006; Monterey, CA; Jan. 18-20, 2006; pp. 1-11.

Tyler et al.; "Electrical conductivity of the global ocean;" Earth, Planets and Space (2017) 69:156; pp. 1-10.

National Centers for Environmental Information; "World Ocean Database;" website: www.nodc.noaa.gov/OC5/WOD/pr_wod.html; 2018; 2 pages.

Boyer et al.; "World Ocean Database 2013;" NOAA Atlas NESDIS 72; Silver Spring, MD; Sep. 2013; pp. 1-209.

USDA Natural Resources Conservation Service, National Cooperative Soil Survey; "Web Soil Survey;" website: websoilsurvey.nrcs.usda.gov/app/; last Modified: Apr. 9, 2019; 2 pages.

USDA Natural Resources Conservation Service, Soils; "Soil Survey;" website: www.nrcs.usda.gov/wps/portal/nrcs/main/soils/survey/: 2 pages.

USDA Natural Resources Conservation Service; "Web Soil Survey;" Website: websoilsurvey.nrcs.usda.gov/app/WebSoilSurvey.aspx; 1 page.

Hartnett et al.; "A Methodology to Map Airport ASF's for Enhanced Loran;" Conference Paper; Jun. 2005; pp. 1-10.

Chen et al.; "ASF Correction Within an Integrated Navigation System of Loran-C / RDSS;" Proceedings of the 2007 National Technical Meeting of the Institute of Navigation; Jan. 22-24, 2007; San Diego, CA; pp. 357-360.

Wnong et al.; "Prediction and Measurement of Loran-C Additional Secondary Factor (ASF);" Conference Paper; Future Wireless Networks and Information Systems; Lecture Notes in Electrical Engineering book series (LNEE, vol. 144); pp. 225-232.

Meng et al.; "ASF seasonal correction of Loran-C based on artificial neural network ;" Proceedings of the IEEE 2009 National Aerospace & Electronics Conference (NAECON) ; Jul. 21-23, 2009; Dayton, OH, USA; pp. 304-307.

Lo et al.; "Assessment of the Methodology for Bounding Loran Temporal ASF for Aviation;" Proceedings of the 2008 National Technical Meeting of The Institute of Navigation; Jan. 28-30, 2008; San Diego, CA ; pp. 432-442.

Johnson et al.; "Temporal variation of Loran ASFs and their effects on HEA navigation;" European Navigation Conference, Mar. 20, 2008; pp. 1-10.

Johnson et al.; "A Procedure for Creating Optimal ASF Grids for Harbor Entrance & Approach;" Proceedings of the 19th International Technical Meeting of the Satellite Division of The Institute of Navigation (ION GNSS 2006); Sep. 26-29, 2006; Fort Worth, TX; pp. 2027-2038.

Hwang et al.; "An analysis on ASF variations and temperature;" Proceeding of the 2014 IEEE/ION Position, Location and Navigation Symposium; pp. 882-885.

ITU; "Handbook on Ground Wave Propagation;" Radiocommunication Bureau; Edition on 2014; pp. 1-66.

Wells et al. "Loran-C Phaselag Invesigation;" Technical Report No. 96; Mar. 1983; pp. 1-110.

Williams et al.; "Modeling Loran-C Envelope-to-Cycle Differences in Mountainous Terrain;" Proceedings of International Loran Association (ILA); 32nd Annual Convention and Technical Symposium; Boulder, Colorado; Nov. 3-7, 2003; pp. 1-22.

Safar, Jan; "Analysis, Modeling and Mitigation of Cross-Rate Interference in Enchanced Loran;" Doctoral Thesis; Prague, Aug. 2014; pp. 1-323.

Zhou et al.; "Long-range Loran-C ground-wave propagation prediction based on adaptive moving window finite-difference time-domain method with compute unified device architecture parallel computing techniques;" The Institution of Engineering and Technology; IET Microw. Antennas Propag.; 2015; vol. 9; Issue 5; pp. 413-422.

Zhou et al.; "Loran-C Ground-wave propagation Prediction Based on the Calibrated Two-way NAPE Algorithm;" IEEE; 2016; 1 page.

Dana, Peter H.; "Geographic Information System Loran-C Coverage Modeling;" Proceedings of the Twenty-Second Annual Technical Symposium; Santa Barbara, California; Oct. 18-21, 1993; pp. 1-9.

International Telecommunication Union; "The Phase of the Ground Wave;" Report 716-3; (1978-1982-1986-1990); pp. 1-4.

International Telecommunication Union; "Recommendations and Reports of the CCIR;" XVIth Plenary Assembly Dubrovnik, 1986; vol. V; Geneva; pp. 1-578.

Levy et al. "Propagation of Electromagnetic Pulses Around the Earth;" Article; IRE Transactions on Antennas and Propagation; Jan. 1958; pp. 56-61.

Johler, Ralph J.; "Propagation of the Low-Frequency Radio Signal;" Proceedings of the IRE; Apr. 1965; pp. 404-427.

Wait, James R.; "A Note on Surface Waves and Ground Waves;" IEEE Transactions on Antennas and Propagation; Nov. 1965; pp. 996-997.

Wait, James R.; "Mixed Path Ground Wave Propatation: 1. Short Distances;" Journal of Research of the National Bureao of Standards; Research paper 2687; vol. 57; No. 1; Jul. 1956; pp. 1-15.

Wait, James R.; "On the Theory of Mixed-Path Ground-Wave Propagation on a Spherical Earth;" Journal of Research of the National Bureau of Standard—D. Radio Propagation; vol. 65D; No. 4; Mar. 1961; pp. 401-415.

Albrecht, H.J.; "Geographical Districution of Electrical Ground Parameters and Effects on Navigational Systems;" Appeared in NATO AGA12DCP33, AGARD Conference Proceedings No. Thirtythree; 1970; pp. 337-347.

ISRIC World Soil Information; "Accessing WoSIS-derived datasets;" website: www.isric.org/explore/wosis/accessing-wosis-derived-datasets; 2019; pp. 1-8.

Kuvshinov et al.; "3-D modelling the electric field due to ocean tidal flow and comparison with observations;" Geophysical Research Letters, vol. 33, L06314, doi:10.1029/2005GL025043, 2006; pp. 1-5.

Schnepf et al.; "Can we probe the conductivity of the lithosphere and upper mantle using satellite tidal magnetic signals?;" AGU Publications; Satellite Tidal Magnetic Signals; Geophysical Research Letter No. 10.1002/2015GL063540; 2015; pp. 3233-3239.

(56) References Cited

OTHER PUBLICATIONS

Schnepf et al.; "Tidal signals in ocean bottommagnetic measurements of the Northwestern Pacific: Observation versus prediction;" Geophysical Journal International; 2014; 198(2); pp. 1096-1110.

Sabaka et al.; "CM5, a pre-Swarm comprehensive geomagnetic field model derived from over 12 yr of CHAMP, Orsted, SAC-C and observatory data;" Geophysical Journal International; 2015; 200(3); pp. 1596-1626.

Tyler et al.; "Satellite observations of magnetic fields due to ocean tidal flow;" Science 299(5604); Jan. 10, 2003; pp. 239-241.

Hargreavescet al: "ASF quality assurance for eLoran"; Position Location and Navigation Symposium (PLANS); 2012 IEEE/ION; IEEE; Apr. 23, 2012, pp. 1169-1174.

Se Phil Song et al: "Verification of GPS aided error compensation method for eLoran using raw TOA measurements"; Control. Automation and Systems (ICCAS); 2011 11th International Conference On; IEEE; Oct. 26, 2011, pp. 1620-1624.

\* cited by examiner

ENHANCED LORAN SYSTEM GENERATING CORRECTION FACTORS BASED UPON SATELLITE-DERIVED DATA AND RELATED METHODS

FIELD OF THE INVENTION

The present invention relates to the field of navigation and, more particularly, to the enhanced Long Range Navigation (eLORAN) system and related methods.

BACKGROUND OF THE INVENTION

The Long Range Navigation (LORAN) system was developed in the United States during World War II. Subsequent implementations provided for enhancements in accuracy and usefulness, including LORAN-C and later enhanced LORAN (eLORAN) implementations. The eLORAN system is a low frequency radio navigation system that operates in the frequency band of 90 to 110 kHz and includes transmissions that propagate by ground wave. The eLORAN system transmits LORAN type navigation RF pulses at a center frequency of about 100 kHz and differs from LORAN-C in that eLORAN transmissions are synchronized to the UTC similar to GPS, and include time-of-transmission control, differential corrections similar to differential GPS, the use of "all-in-view" tracking, and one or more eLORAN data channels that provide low-rate data messaging, differential corrections, and almanac information.

With the rise of satellite-based navigation systems such as Global Positioning System (GPS), there has been relatively little development or investment in terrestrial-based navigation systems, such as the eLORAN system, until recently. A renewed interest in such systems has arisen regarding eLORAN as a backup to satellite based navigation and timing systems, particularly since low frequency eLORAN signals are less susceptible to jamming or spoofing compared to the relatively higher frequency and lower powered GPS signals.

In current eLORAN systems, each eLORAN receiver is pre-loaded with a set of fixed, additional secondary factor (ASF) maps. The ASF map values are measured correction factors for the theoretical time-of-flight of the transmitted pulses for the path from transmitter to receiver. These correction factors are due to humidity, soil conductivity, and other environmental conditions. There is usually one unique ASF map per eLORAN transmitter. The values in these fixed ASF maps are interpolated and extrapolated at an eLORAN receiver from one-time ASF measurements that were acquired using a single moving ASF mapping receiver in a coarse grid across a coverage area of interest. For example, an ASF mapping vehicle could travel at high speed along selected roads making a single pass, and thus, acquire the values for implementing the ASF Map, which are stored in each eLORAN receiver. Reference stations that are located in populated areas or major ports that require more accurate eLORAN positioning may measure and distribute time-varying "local" ASF corrections that are valid in about 35 kilometer radius coverage circles from a reference station. These "local" ASF corrections are transmitted in near real-time via the eLORAN data channel (LDC).

There is a need for further developments in the eLORAN system to improve eLORAN system performance in certain applications.

SUMMARY

An enhanced Long Range Navigation (eLORAN) system may include an eLORAN controller configured to obtain satellite-derived conductivity data and satellite-derived temperature data for different geographical positions and generate eLORAN correction factors based thereon. The eLORAN system may also include a plurality of eLORAN transmitter stations and at least one eLORAN receiver device. The at least one eLORAN device may include an eLORAN receive antenna, and an eLORAN receiver coupled to the eLORAN receive antenna and configured to receive the eLORAN correction factors. The eLORAN receiver device may also include a controller coupled to the eLORAN receiver and configured to cooperate with the plurality of eLORAN transmitter stations to determine an eLORAN receiver position corrected based upon the eLORAN correction factors.

The controller may be configured to cooperate with the plurality of eLORAN transmitter stations to determine an eLORAN receiver clock error corrected based upon the eLORAN correction factors, for example. The satellite-derived conductivity data may be based upon satellite-derived soil moisture data. The satellite-derived conductivity data may be based upon satellite-derived ocean surface data, for example.

The satellite-derived conductivity data may be based upon satellite-derived rainfall rate data. The satellite-derived conductivity data may be based upon at least one of satellite-derived snow coverage data and satellite-derived ice coverage data, for example.

The eLORAN controller may be configured to obtain baseline conductivity data for the different geographical positions, and generate the eLORAN correction factors based upon the baseline conductivity data, for example. The eLORAN controller may be configured to generate the eLORAN correction factors at different times.

Each eLORAN transmitter station may include an eLORAN transmit antenna, and an eLORAN transmitter coupled to the eLORAN transmit antenna. The eLORAN transmitter may be configured to transmit a series of eLORAN navigation RF pulses.

A method aspect is directed to a method for enhanced Long Range Navigation (eLORAN) position determining using an eLORAN receiver device that includes an eLORAN receive antenna, an eLORAN receiver coupled to the eLORAN receive antenna, and a controller coupled to the eLORAN receiver. The method may include using an eLORAN controller to obtain satellite-derived conductivity data and satellite-derived temperature data for different geographical positions and to generate eLORAN correction factors based thereon. The method may also include using a plurality of eLORAN transmitter stations to cooperate with the eLORAN receiver so that the controller of the eLORAN receiver device determines an eLORAN receiver position and receiver clock error corrected based upon the eLORAN correction factors.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
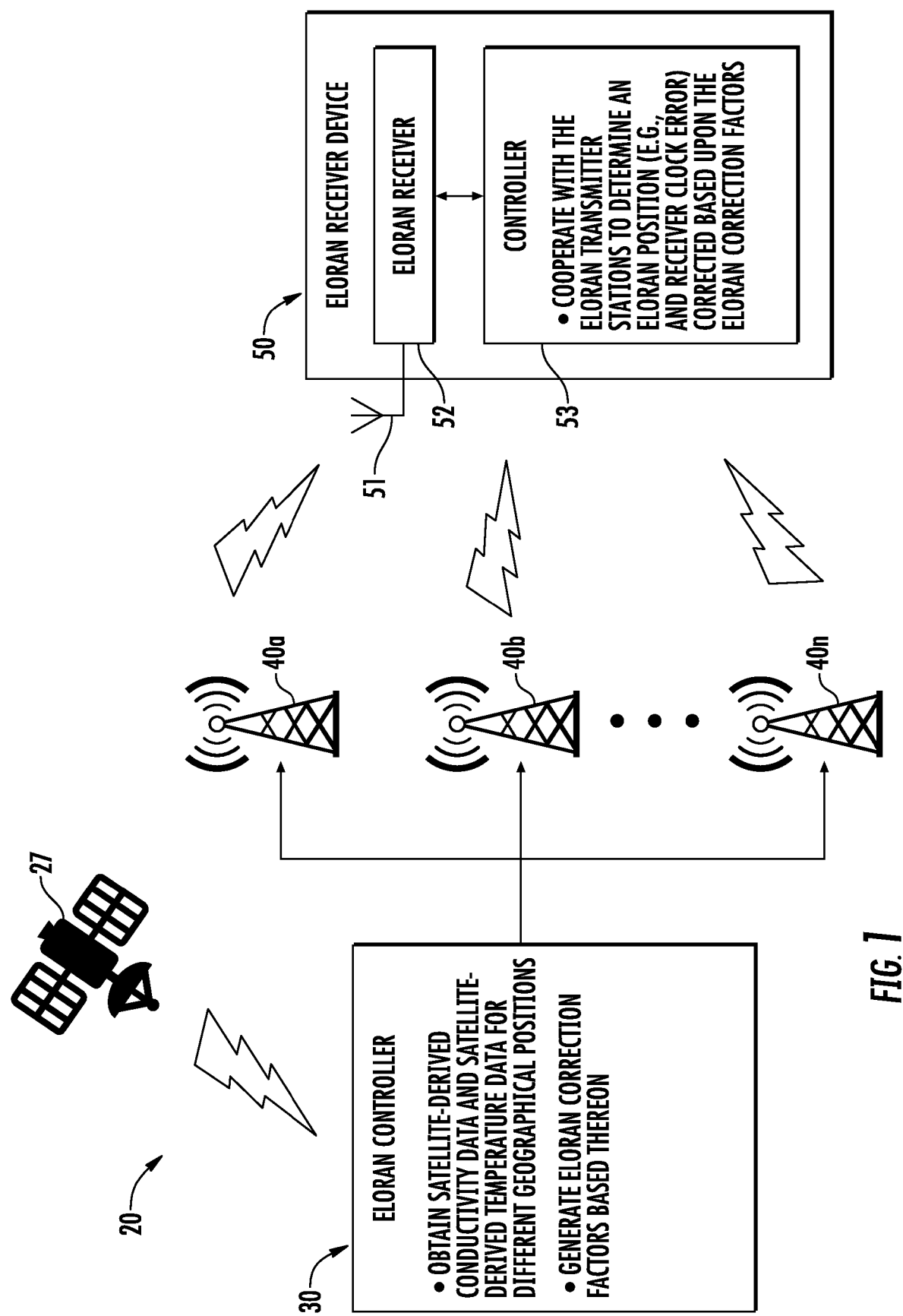
FIG. 1 is a schematic diagram of an eLORAN system according to an embodiment.
Figure 2:
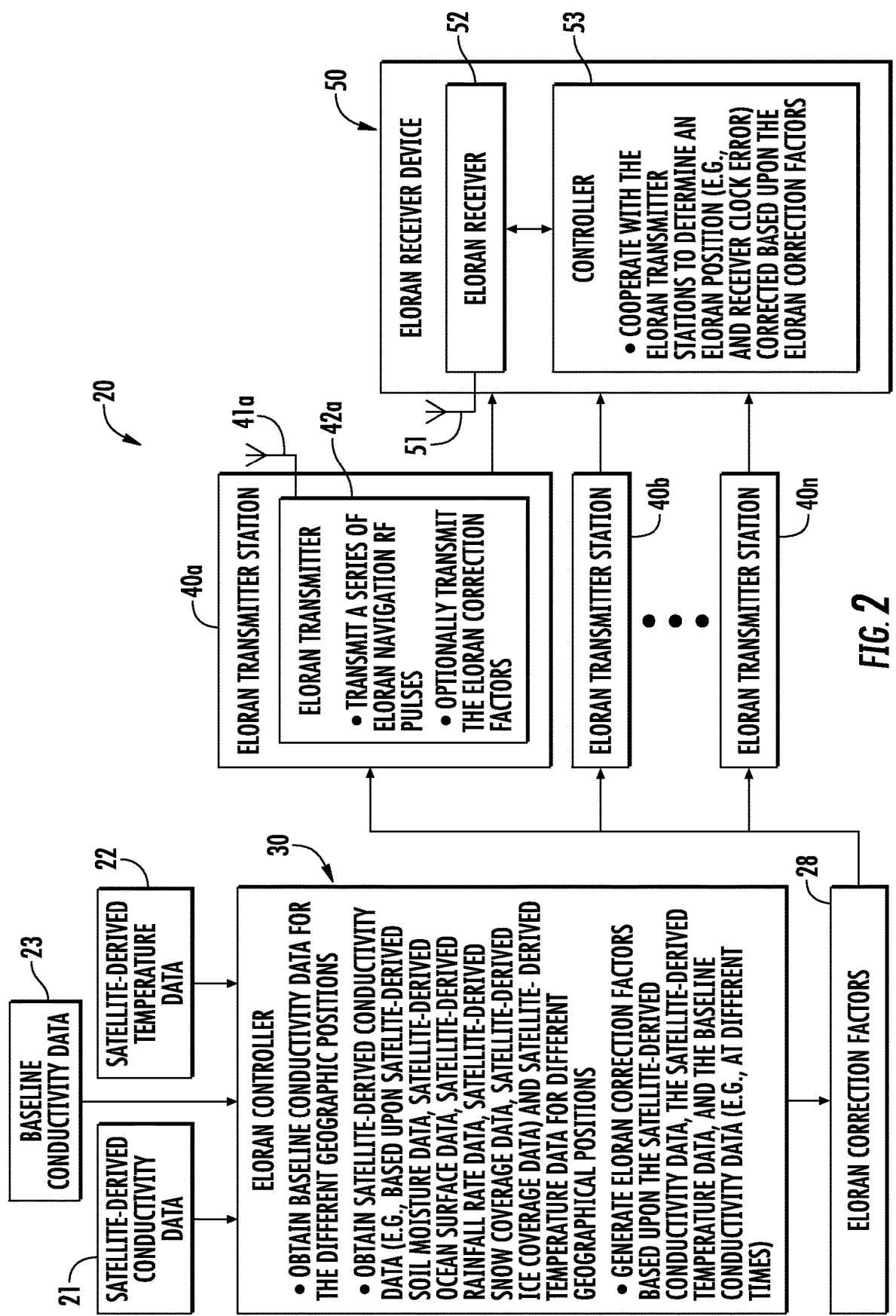
FIG. 2 is a schematic block diagram of the eLORAN system of FIG. 1.

Referring initially to FIGS. 1 and 2, an enhanced Long Range Navigation (eLORAN) system 20 includes an eLORAN controller 30 configured to obtain satellite-derived conductivity data 21 and satellite-derived temperature data 22 for different geographical positions. By satellite-derived it should be appreciated by those skilled in the art that the source of the data is from one or more satellites 27 as will be described in further detail below. It should also be understood by those skilled in the art that the satellite-derived conductivity data 21 and satellite-derived temperature data 22 may be processed and/or formatted by the eLORAN controller 30 and/or another processor or controller. In other words, the eLORAN controller 30 may receive raw data from the satellites 27.

In some embodiments, the eLORAN controller 30 may obtain raw data from the satellites 27. The satellite-derived conductivity data 21 may be based upon satellite-derived soil moisture data. The satellite-derived conductivity data 21 may be based upon satellite-derived ocean surface conductivity data. The satellite-derived conductivity data 21 may be based upon satellite-derived rainfall rate data. The satellite-derived conductivity data 21 may be based upon one or more of satellite-derived snow coverage data and satellite-derived ice coverage data, for example.

The eLORAN controller 30 generates eLORAN correction factors based upon the satellite-derived conductivity data 21 and the satellite-derived temperature data 22. The eLORAN controller 30 may generate the eLORAN correction factors at different times, for example, seasonally and/or periodically (e.g., daily, weekly, monthly, quarterly, etc.)

In some embodiments, the eLORAN controller 30 may obtain baseline conductivity data 23 for the different geographical positions. More particularly, the eLORAN controller 30 may obtain detailed ground conductivity and permittivity values with known soil moisture content levels from one or more different databases (e.g., national databases), which may be used as the baseline conductivity data 23.

The eLORAN system 20 also includes eLORAN transmitter stations 40a-40n. Each eLORAN transmitter station 40a-40n includes an eLORAN transmit antenna 41a and eLORAN transmitter 42a coupled to the eLORAN transmit antenna. Each eLORAN transmitter station 40a-40n may transmit the eLORAN correction factors. In some embodiments, the eLORAN correction factors may be communicated by other techniques, for example, a back channel. Each eLORAN transmitter 42a also transmits a series of eLORAN navigation RF pulses.

The eLORAN system 20 also includes an eLORAN receiver 50 device. The eLORAN receiver device 50 includes an eLORAN receive antenna 51, and an eLORAN receiver 52 coupled to the eLORAN receive antenna to receive the eLORAN correction factors 28. The eLORAN receiver device 50 also includes a controller 53 coupled to the eLORAN receiver 52 that cooperates with the eLORAN transmitter stations 40a-40n to determine an eLORAN receiver position and receiver clock error corrected based upon the eLORAN correction factors 28.

Figure 3:
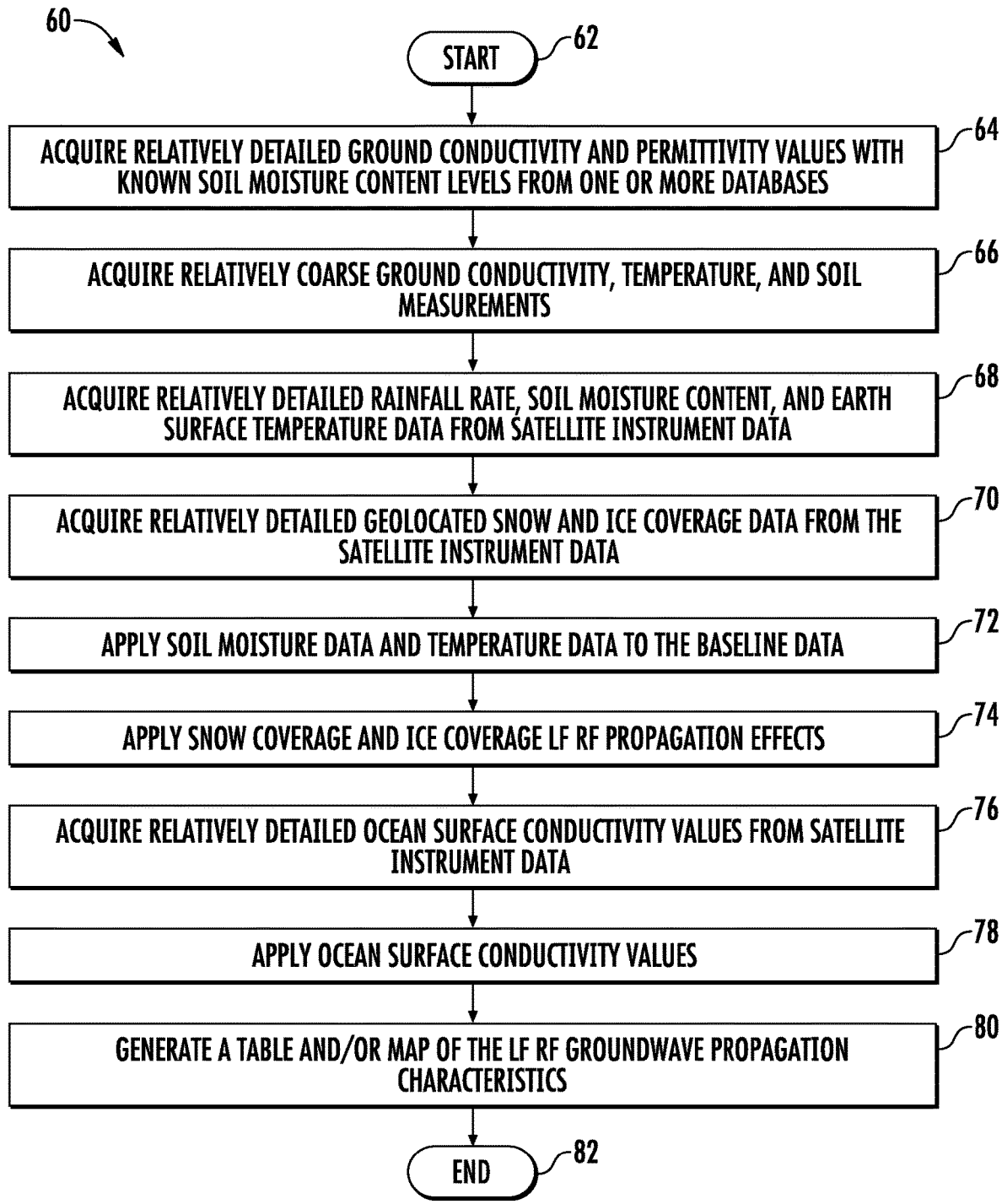
FIG. 3 is a flow diagram of an eLORAN method in accordance with an embodiment.

Referring now additionally to the flowchart 60 in FIG. 3, beginning at Block 62, further details of determining position using the eLORAN system 20 will now be described. As will be described below, the eLORAN system 20 described herein uses a combination of existing terrestrial instruments, existing satellite scientific instruments and available databases, and modified existing low frequency (LF) ground wave propagation modeling tools to determine propagation delays of LF ground waves as they are impacted by conductivity, permittivity, salinity and temperature. Propagation delay tables or maps may be created.

The eLORAN controller 30 acquires relatively detailed ground conductivity and permittivity values with known soil moisture content levels from one or more databases, for example, national databases, and uses these values as a baseline (Block 64). More particularly, the databases may be used to generate a detailed grid of soil conductivity at known content levels as a baseline. The databases may also be used to generate a grid of ocean surface conductivity at known content levels also as a baseline. At Block 66, the eLORAN controller 30 acquires relatively coarse, e.g., in real-time or near-real-time, ground conductivity, temperature, and soil moisture measurements, for example, from a network such as a national network, for correlation of satellite instrument data. It should be noted that the Geostationary Operational Environmental Satellite (GOES) system already correlates data.

The eLORAN controller 30 acquires relatively detailed, e.g., in near-real-time, geolocated rainfall rate, soil moisture content, and earth surface temperature data (e.g., soil and/or sea water temperatures) from satellite instrument data, such as the GOES system, Himawari, and/or the Joint Polar Satellite System (JPSS) (Block 68). Of course, other satellites or satellite instrument data may be used.

At Block 70, the eLORAN controller 30 acquires relatively detailed, e.g., in near-real-time, geolocated snow and ice coverage data from the satellite instrument data. Those skilled in the art will appreciate that terrestrial instruments may be used to calibrate the satellites or satellite instrument data.

Soil moisture data and temperature data are applied to the baseline data to arrive at updated conductivity/resistivity and permittivity values (Block 72). The models or modeling tools implemented by the eLORAN controller 30 may be modified to accept higher density, more accurate and detailed conductivity and dielectric values, as will be appreciated by those skilled in the art.

At Block 74, the eLORAN controller 30 applies snow coverage and ice coverage LF radio frequency (RF) groundwave propagation effects. At Block 76, relatively detailed ocean surface values are acquired (e.g., in near real time) from the satellite instrument data (e.g., salinity). The eLORAN controller 30 may also acquire detailed ocean water salinity data from the terrestrial instruments to calibrate the satellite instrument data for the ocean water temperatures and/or ocean surface conductivity values.

Ocean surface conductivity values are applied (Block 78) by the eLORAN controller 30. The eLORAN controller 30 may implement models or modeling tools that may be modified to accept the varying ocean surface conductivity values.

The eLORAN controller 30 at Block 80, creates or generates a table and/or map of LF RF groundwave propagation characteristics. The tables and/or maps may be generated with updated propagation delay values which can be used to determine the time-of-arrival of an LF signal with greater accuracy than previous approaches. Moreover, these tables or maps can be provided to LF navigation and time system receivers/users to increase the accuracy of a time or position determination (e.g., to correct errors in position and clock error). Operations end at Block 82.

Indeed, as will be appreciated by those skilled in the art, most propagation models only produce results that are only as accurate as the databases used for the calculations. Increased precision surface impedance and terrain measurements may thus be highly desirable, but oftentimes, this data is not available. For example, the U.S. conductivity database includes only 16 levels. Additionally, conductivity databases often have limited resolution. Therefore, the accuracy of the conductivity database is limited unless every point is measured, for example.

Those skilled in the art will appreciate that changes in impedance may be seasonal due to weather changes. The resulting conductivity changes limit the accuracy of the modeled additional secondary factors (ASFs).

Currently, low frequency eLORAN signal propagation characteristics over land are either measured and recorded or modeled using relatively very low precision soil conductivity charts. Over sea, a single conductivity value is typically used.

Measuring of conductivity may be accomplished by the use of vehicles or naval vessels. Attempts at using aviation platforms may be undesirable as those techniques may not provide the desired accuracy. Nonetheless, the above-methods of measuring conductivity are all relatively costly and time consuming, particularly when it is desirable to characterize a large area, e.g., the continental United States.

While models may be used to predict conductivity, these models are dependent on old or outdated soil conductivity maps and databases that do not have adequate resolution, and were provided for frequencies outside the 100 kHz eLORAN spectrum. A single conductivity value is typically used for propagation over sea.

Soil Conductivity varies with changes in moisture content, temperature, and the presence of ice and snow. Also, sea surface conductivity changes with salinity and temperature.

In particular, for eLORAN propagation modelling, the following equation is typically used:

True Propagation Time=$PF+SF+ASF$ where PF=2.99691162e8 m/s (propagation time for the signal to traverse the atmosphere), SF (secondary factor)= delays for signal over salt seawater with a conductivity of 5000 mS/m (assumes the entire signal path is over sea water and that dielectric and conductivity properties are constant), and ASF (additional secondary factor)=incremental propagation delay of the signal over heterogeneous earth (vs. seawater).

With respect to ASF data, one relatively key parameter is impedance (conductivity) of the surface. ASF data is generally considered a function of distance, surface impedance (conductivity), topography, surface temperature, and moisture content. Variations of weather, time of day (sun), and other environmental changes throughout the day may influence ASF data.

With respect to LF ground wave propagation, influential factors may include the spherical shape of the Earth and spatial variations, for example, coastlines, topography, and ground impedance. Factors influencing the ground impedance may include ground conductivity (e.g., soil moisture), dielectric constant, and vertical geological ground structure, for example. Another factors that may affect LF ground wave propagation may include variations, such as, for example, surface impedance change due to weather, the influence to the index of refraction of air at the surface of the ground due to weather, and variations of the gradient of the index of refraction (at surface of ground with altitude above the surface).

As will be appreciated by those skilled in the art, the eLORAN system 20 described herein addresses the shortcomings noted above and with consideration of and correction for the various factors described above. By using a combination of existing terrestrial instruments, existing satellite scientific instruments and available databases, and modified existing Low Frequency (LF) ground wave propagation modeling tools, propagation delays of low frequency (LF) ground waves as they are impacted by conductivity, permittivity, salinity and temperature may be determined by the eLORAN system 20 and propagation delay tables or maps may be created for correction of errors, for example, that may be created through propagation errors and delays, as described above. Accordingly, the eLORAN system 20 may provide improved accuracy with respect to errors of eLORAN receiver position and clock error.

A method aspect is directed to a method for enhanced Long Range Navigation (eLORAN) position determining using an eLORAN receiver device 50 that includes an eLORAN receive antenna 51, an eLORAN receiver 52 coupled to the eLORAN receive antenna, and a controller 53 coupled to the eLORAN receiver. The method includes using an eLORAN controller 30 to obtain satellite-derived conductivity data 21 and satellite-derived temperature data 22 for different geographical positions and to generate eLORAN correction factors 28 based thereon. The method also includes using a plurality of eLORAN transmitter stations 40a-40n to transmit the eLORAN correction factors 28 and cooperate with the eLORAN receiver 52 so that the controller 53 of the eLORAN receiver device determines an eLORAN receiver position and receiver clock error corrected based upon the eLORAN correction factors.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An enhanced Long Range Navigation (eLORAN) system comprising:
    an eLORAN controller configured to obtain satellite-derived geolocated rainfall rate, soil moisture content, and soil and sea water temperatures as detailed satellite-derived data for different geographical positions, and acquire conductivity and permittivity values with known soil moisture content levels and ocean surface conductivity from existing databases to generate a detailed grid of soil conductivity at known content levels and a detailed grid of ocean surface conductivity at known content levels to determine baseline conductivity data, and acquire coarse ground conductivity, temperature and soil moisture measurements from a national network, and correlate the baseline conductivity data with the detailed satellite-derived data and coarse ground conductivity, temperature and soil moisture measurements to generate eLORAN correction factors based thereon;

a plurality of eLORAN transmitter stations; and
at least one eLORAN receiver device comprising
an eLORAN receive antenna,
an eLORAN receiver coupled to the eLORAN receive antenna and configured to receive the eLORAN correction factors, and
a controller coupled to the eLORAN receiver and configured to cooperate with said plurality of eLORAN transmitter stations to determine an eLORAN receiver position corrected based upon the eLORAN correction factors.

2. The eLORAN system of claim 1 wherein said controller is configured to cooperate with said plurality of eLORAN transmitter stations to determine an eLORAN receiver clock error corrected based upon the eLORAN correction factors.

3. The eLORAN system of claim 1 wherein the satellite-derived conductivity data is based upon at least one of satellite-derived snow coverage data and satellite-derived ice coverage data.

4. The eLORAN system of claim 1 wherein said eLORAN controller is configured to obtain the baseline conductivity data for the different geographical positions, and generate the eLORAN correction factors based upon the baseline conductivity data for the different geographical positions.

5. The eLORAN system of claim 1 wherein said eLORAN controller is configured to generate the eLORAN correction factors at different times.

6. The eLORAN system of claim 1 wherein each eLORAN transmitter station comprises an eLORAN transmit antenna, and an eLORAN transmitter coupled to the eLORAN transmit antenna and configured to transmit a series of eLORAN navigation RF pulses.

7. An enhanced Long Range Navigation (eLORAN) system cooperating with at least one eLORAN receiver device comprising an eLORAN receive antenna, an eLORAN receiver coupled to the eLORAN receive antenna and configured to receive the eLORAN correction factors, and a controller coupled to the eLORAN receiver, the eLORAN system comprising:
an eLORAN controller configured to obtain satellite-derived geolocated rainfall rate, soil moisture content, and soil and sea water temperatures as detailed satellite-derived data for different geographical positions, and acquire conductivity and permittivity values with known soil moisture content levels and ocean surface conductivity from existing databases to generate a detailed grid of soil conductivity at known content levels and a detailed grid of ocean surface conductivity at known content levels to determine baseline conductivity data, and acquire coarse ground conductivity, temperature and soil moisture measurements from a national network, and correlate the baseline conductivity data with the detailed satellite-derived data and coarse ground conductivity, temperature and soil moisture measurements to generate eLORAN correction factors based thereon; and
a plurality of eLORAN transmitter stations configured to cooperate with the eLORAN receiver so that the controller of the eLORAN receiver device determines an eLORAN receiver position corrected based upon the eLORAN correction factors.

8. The eLORAN system of claim 7 wherein said plurality of eLORAN transmitter stations are configured to transmit the eLORAN correction factors so that the controller of the eLORAN receiver device determines an eLORAN receiver clock error corrected based upon the eLORAN correction factors.

9. The eLORAN system of claim 7 wherein the satellite-derived conductivity data is based upon at least one of satellite-derived snow coverage data and satellite-derived ice coverage data.

10. The eLORAN system of claim 7 wherein said eLORAN controller is configured to obtain the baseline conductivity data for the different geographical positions, and generate the eLORAN correction factors based upon the baseline conductivity data for the different geographical positions.

11. The eLORAN system of claim 7 wherein said eLORAN controller is configured to generate the eLORAN correction factors at different times.

12. The eLORAN system of claim 7 wherein each eLORAN transmitter station comprises an eLORAN transmit antenna, and an eLORAN transmitter coupled to the eLORAN transmit antenna and configured to transmit a series of eLORAN navigation RF pulses.

13. A method for enhanced Long Range Navigation (eLORAN) position determining using an eLORAN receiver device comprising an eLORAN receive antenna, an eLORAN receiver coupled to the eLORAN receive antenna, and a controller coupled to the eLORAN receiver, the method comprising:
using an eLORAN controller to obtain satellite-derived geolocated rainfall rate, soil moisture content, and soil and sea water temperatures as detailed satellite-derived data for different geographical positions, and acquire conductivity and permittivity values with known soil moisture content levels and ocean surface conductivity from existing databases to generate a detailed grid of soil conductivity at known content levels and a detailed grid of ocean surface conductivity at known content levels to determine baseline conductivity data, and acquire coarse ground conductivity, temperature and soil moisture measurements from a national network, and correlate the baseline conductivity data with the detailed satellite-derived data and coarse ground conductivity, temperature and soil moisture measurements to generate eLORAN correction factors based thereon; and
using a plurality of eLORAN transmitter stations to cooperate with the eLORAN receiver so that the controller of the eLORAN receiver device determines an eLORAN receiver position corrected based upon the eLORAN correction factors.

14. The method of claim 13 wherein using the plurality of eLORAN transmitter stations comprises using the plurality of eLORAN transmitter stations to cooperate with the eLORAN receiver so that the controller of the eLORAN receiver device determines an eLORAN receiver clock error corrected based upon the eLORAN correction factors.

15. The method of claim 13 wherein the satellite-derived conductivity data is based upon at least one of satellite-derived snow coverage data and satellite-derived ice coverage data.

16. The method of claim 13 wherein using the eLORAN controller comprises using the eLORAN controller to obtain the baseline conductivity data for the different geographical positions, and generate the eLORAN correction factors based upon the baseline conductivity data for the different geographical positions.

17. The method of claim 13 wherein using the eLORAN controller comprises using the eLORAN controller to generate the eLORAN correction factors at different times.

* * * * *